United States Patent
Wang et al.

(10) Patent No.: US 12,071,503 B2
(45) Date of Patent: Aug. 27, 2024

(54) METHOD FOR PREPARING AND REPAIRING COVALENT ORGANIC FRAMEWORK MATERIALS

(71) Applicant: ZHEJIANG UNIVERSITY, Zhejiang (CN)

(72) Inventors: Wenjun Wang, Zhejiang (CN); Song Wang, Zhejiang (CN); Pingwei Liu, Zhejiang (CN); Bogeng Li, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 549 days.

(21) Appl. No.: 17/292,485

(22) PCT Filed: Nov. 19, 2018

(86) PCT No.: PCT/CN2018/116174
§ 371 (c)(1),
(2) Date: May 10, 2021

(87) PCT Pub. No.: WO2020/102936
PCT Pub. Date: May 28, 2020

(65) Prior Publication Data
US 2022/0153904 A1    May 19, 2022

(51) Int. Cl.
C08G 12/08 (2006.01)
C07F 5/02 (2006.01)
C08G 12/06 (2006.01)
C08G 18/38 (2006.01)

(52) U.S. Cl.
CPC .................................. C08G 12/08 (2013.01)

(58) Field of Classification Search
None
See application file for complete search history.

(56) References Cited

U.S. PATENT DOCUMENTS 11,213,800 B2   1/2022   Dichtel et al.

FOREIGN PATENT DOCUMENTS

| CN | 103209763 A | 7/2013 | |
| CN | 105214340 A | 1/2016 | |
| CN | 105440058 A | 3/2016 | |
| CN | 106083909 A | * 11/2016 | ............. C07F 7/081 |
| CN | 107325113 A | 11/2017 | |
| CN | 108794756 A | 11/2018 | |
| EP | 2832767 A1 | 4/2015 | |

OTHER PUBLICATIONS

Ma et al., "Single-crystal x-ray diffraction structures of covalent organic frameworks," Science, 2018, 48-52, AAAS, Washington, DC.
Ding, S. et al., "Covalent organic frameworks (COFs): from design to applications", Chemical Society Reviews, 2013, pp. 548-568, vol. 42.
Jiang, J. et al., "Covalent Chemistry beyond Molecules", Journal of the American Chemical Society, 2016, pp. 3255-3265, vol. 138.
Matsumoto, M. et al., "Rapid, Low Temperature Formation of Imine-Linked Covalent Organic Frameworks Catalyzed by Metal Triflates", Journal of the American Chemical Society, 2017, pp. 4999-5002, vol. 139.
Segura, J. L. et al., "Covalent organic frameworks based on Schiff-base chemistry: synthesis, properties and potential applications", Chemical Society Reviews, 2016, 37 pages.
International Search Report of the International Searching Authority issued in corresponding International Patent Application No. PCT/CN2018/116174, mailed Jul. 30, 2019, 4 pages.
European Research Report for EP Application No. 1890484.1 mailed Jul. 13, 2022 (8 pages).
Matsumoto et al., "Rapid, Low Temperature Formation of Imine-Linked Covalent Organic Frameworks Catalyzed by metal Triflates," J. Am. Chem., 2017, 139:4999-5002.

* cited by examiner

*Primary Examiner* — Daniel Berns
(74) *Attorney, Agent, or Firm* — Merchant & Gould P.C.

(57) ABSTRACT

The present invention relates to a method for preparing a covalent organic framework (COF) materials—a reversible polycondensation/termination method, the COF materials prepared by the method have high crystallinity, high specific surface area, regular and controllable morphology. The present invention also relates to a method for repairing defects of COF materials—reversible degradation-recombination, the method can eliminate defects of existing COF materials, thereby increasing the crystallinity and specific surface area of COF materials and improving their morphological characteristics.

8 Claims, No Drawings

METHOD FOR PREPARING AND REPAIRING COVALENT ORGANIC FRAMEWORK MATERIALS

This application is a National Stage Application of PCT/CN2018/116174, filed 19 Nov. 2018, which application is incorporated herein by reference. To the extent appropriate, a claim of priority is made to the above disclosed application.

TECHNICAL FIELD

The present invention relates to a method for preparing covalent organic framework (COF) materials—a reversible polycondensation/termination method. The COF materials prepared by the method have high crystallinity, high specific surface area, regular and controllable morphology. The present invention also relates to a method for repairing defects of COF materials—reversible degradation-recombination method, the method can eliminate defects of existing COF materials, thereby increasing the crystallinity and specific surface area of COF materials and improving their morphological characteristics.

BACKGROUND ART

COF materials are a class of well-known porous materials, which have the advantages of high specific surface area, precise pore structure, high stability and rich variety. They are widely used in separation, catalysis, gas storage, sensors, drug release and other fields.

Traditional methods for preparing COF materials usually produce products with low crystallinity and irregular morphology, which greatly reduce the specific surface area and the regularity of pore structure, thus restricting the application of the materials. EP2832767A1 discloses a method for preparing COF by acetic acid catalysis at room temperature, however, the COF materials obtained by this method have low crystallinity and are only suitable for Schiff base's COF materials. CN105214340A discloses a method for preparing COF materials by introducing polydopamine coating layer to prepare COF crystals, the method has low yield and complex process, and is only suitable for borate COF materials. CN106083909A discloses a method for preparing single crystal COF materials by introducing nucleation inhibitor aniline to prepare single crystal COF materials, however, the method is only suitable for 3D Schiff base's COF materials. In summary, the current methods for preparing COF materials generally have the shortcomings of narrow application range, complicated processes, poor morphology controllability, etc., and the grain size is usually less than 50 nm, and the specific surface area is usually 100-1500 $m^2/g$. Therefore, there is a need of an improved method for preparing COF materials in the art, which can prepare COF materials with high specific surface area, high crystallinity, and improved morphology.

SUMMARY OF THE INVENTION

The inventor has found through research that by introducing a control agent into the preparation process of COF materials, the deficiencies of the prior art can be solved, and COF materials with improved performance can be obtained.

Therefore, in one aspect, the present invention relates to use of control agents AP and BP in the preparation of COF materials, wherein the control agents AP and BP are described in detail below.

On the other hand, the present invention provides a new method for preparing COF materials—reversible polycondensation-termination (RPT) method. Specifically, the present invention relates to a method for preparing a COF material by RPT, comprising the steps:
dissolving a monomer A in solvent 1, adding a control agent AP, and optionally adding a catalyst CA to obtain a solution A;
dissolving a monomer B in solvent 2, adding a control agent BP, and optionally adding a catalyst CB to obtain a solution B;
mixing the solution A and the solution B to obtain a mixed solution, and allowing the mixed solution to react; and
after the completion of the reaction, separating obtained precipitate and drying it obtain COF material.

Monomer A is those known in the art for preparing COF materials. For example, it can be selected from the group consisting of aromatic amines and derivatives thereof, aromatic hydrazides and derivatives thereof, aromatic boronic acids and derivatives thereof, and aromatic nitriles and derivatives thereof. Examples of monomer A include, but are not limited to, 1,4-phenylenediamine, 2,5-dimethyl-1,4-phenylenediamine, tetramethyl-p-phenylenediamine, benzidine, 3,3',5,5'-tetramethylbiphenyl-4,4'-diamine, 3,3'-dinitrobenzidine, 4,4'-diaminoterphenyl, 4,4'-diaminostilbene, p-diaminoazobenzene, 2,6-anthracene diamine, 3,4-diaminotetrahydrofuran, hydrazine, 1,2-cyclohexanediamine, 1,2,4,5-bis(dihydrazide)benzene, 1,3,5-tris(4-aminophenyl)benzene, 2,4,6-tris(4-aminophenyl)-1,3,5-triazine, melamine, 5,10,15,20-tetra(4-aminophenyl)porphyrin, 1,2,4,5-benzenetetraamine, hexaaminobenzene, 1,6-diaminopyrene, 2,3,6,7,10,11-hexaaminotriphenylene, 1,4-benzenediboronic acid, 1,3,5-benzenetriboronic acid, 1,4-benzenediboronic acid dipinacyl ester, 4,7-bisboronic acid-2,1,3-benzothiadiazole, 4,7-bis(4,4,5,5-tetramethyl-1,3,2-dioxaborolan-2-yl)-2,1,3-benzothiadiazole, 2,7-pyrene bisboronic acid, 2,7-bis(4,4,5,5-tetramethyl-1,3,2-dioxaborolan-2-yl)pyrene, 4,4'-biphenyl diboronic acid, 4,4'-biphenyl diboronic acid dipinacol ester, 5,10,15,20-tetra(4-boronophenyl)porphyrin, terephthalonitrile, 2,6 anthracene dinitrile, terephthalohydrazide, 2,5-dimethoxyterephthalohydrazide, 2,5-diethoxyterephthalohydrazide, and combinations thereof. Preferred monomer A includes 1,4-phenylenediamine, 1,3,5-tris(4-aminophenyl)benzene, 2,4,6-tris(4-aminophenyl)-1,3,5-triazine, 5,10,15,20-tetra(4-aminophenyl) porphyrin, 1,4-benzenediboronic acid, 1,3,5-benzenetriboronic acid, 5,10,15,20-tetra(4-boronophenyl) porphyrin, terephthalhydrazide, and combinations thereof. The above monomers are all commercially available or prepared by known methods.

Monomer B is those known in the art for preparing COF materials. For example, it can be selected from the group consisting of aromatic aldehydes and derivatives thereof, aromatic boronic acids and derivatives thereof, phenols and derivatives thereof, alcohols and derivatives thereof, and aromatic nitriles and derivatives thereof. Examples of monomer B include, but are not limited to, terephthalaldehyde, biphenyldialdehyde, 2,5-dihydroxyterephthalaldehyde, 2,5-dimethoxyterephthalaldehyde, 2,3-dihydroxyterephthalaldehyde, 2,3-dimethoxyterephthalaldehyde, 2,5-diynyloxyterephthalaldehyde, glyoxal, trimesaldehyde, 2,4,6-trihydroxytrimesaldehyde, 1,3,5-tris(4-aldehyde phenyl)benzene, 2,4,6-tris(4-aldehyde phenyl)-1,3,5-triazine, cyclohexanone, 1,4-benzenediboronic acid, 1,3,5-benzenetriboronic acid, 1,4-benzenediboronic acid dipinacyl ester, 4,7-bisboronic acid-2,1,3-benzothiadiazole, 4,7-bis(4,4,5,5-tetramethyl-1,3,2-dioxaborolan-2-yl)-2,1,3-benzothiadiazole, 2,7-pyrene bisboric acid, 2,7-bis(4,4,5,5-tetramethyl-1,3,2-dioxaborolan-2-yl)pyrene, 4,4'-biphenyl diboronic acid, 4,4'-biphenyl diboronic acid dipinacol ester, 5,10,15,20-tetra(4-boronolphenyl) porphyrin, 1,2,4,5-benzenetetrol, 3,6-dimethyl-1,2,4,5-benzenetetrol, 3,6-diethyl-1,2,4,5-benzenetetrol, 3,6-dipropyl-1,2,4,5-benzenetetrol, 2,3,6,7-naphthalenetetraphenol, 2,3,6,7-anthratetraphenol, 3,6,7,10,11-hexahydroxytriphenylene, terephthalonitrile, 2,6-anthradionitrile, and combinations thereof. Preferred monomer B includes terephthalaldehyde, biphenyldialdehyde, 2,4,6-trihydroxytrimesaldehyde, 1,2,4,5-benzenetetrol, 3,6,7,10,11-hexahydroxytriphenylene, 1,4-benzenediboric acid, 1,3,5-benzenetriboronic acid, and combinations thereof. The above monomers are all commercially available or prepared by known methods.

Solvent 1 and solvent 2 and amounts thereof are known in the art. Solvent 1 and solvent 2 can be the same or different, and can include, but are not limited to, alkanes, aromatic hydrocarbons, alcohols, ethers, ketones, esters, amides, sulfoxides, water, and derivatives thereof. Specific examples thereof include, but are not limited to, isopentane, n-pentane, petroleum ether, hexane, cyclohexane, isooctane, trifluoroacetic acid, heptane, carbon tetrachloride, benzene, toluene, xylene, trimethylbenzene, chlorobenzene, dichlorobenzene, ethyl ether, isobutanol, n-butanol, propanol, ethanol, methanol, dichloromethane, chloroform, ethyl acetate, tetrahydrofuran, dioxane, acetone, pyridine, acetonitrile, dimethyl sulfoxide, N,N-dimethylformamide, N,N-dimethylacetamide, acetic acid, formic acid, water, and combinations thereof.

The control agent AP is selected from the group consisting of monoaldehydes and derivatives thereof, monoboric acids and derivatives thereof, phenols and derivatives thereof, alcohols and derivatives thereof, and mononitriles and derivatives thereof. Examples of control agents AP include, but are not limited to, benzaldehyde, 2-chlorobenzaldehyde, 3-chlorobenzaldehyde, 4-chlorobenzaldehyde, 2-nitrobenzaldehyde, 3-nitrobenzaldehyde, 4-nitrobenzaldehyde, 2-methylbenzaldehyde, 3-methylbenzaldehyde, 4-methylbenzaldehyde, 4-tert-butylbenzaldehyde, 4-fluorobenzaldehyde, 1-naphthaldehyde, 2-naphthaldehyde, formaldehyde, acetaldehyde, propionaldehyde, butyraldehyde, valeraldehyde, hexanal, heptaldehyde, caprylic aldehyde, phenylboronic acid, 4-tert-butylbenzeneboronic acid, n-propylboronic acid, cyclohexylboronic acid, catechol, 2,3-dihydroxyl naphthalene, ethylene glycol, 2,3-dimethyl-2,3-butanediol, 1,2-cyclohexanediol, benzonitrile, naphthalenenitrile, acetonitrile, cyclohexanenitrile, and combinations thereof. Preferred control agents AP include benzaldehyde, 4-tert-butylbenzaldehyde, butyraldehyde, phenylboronic acid, catechol, ethylene glycol, benzonitrile, and combinations thereof. These control agents AP are commercially available or prepared by a known method.

The control agent BP is selected from the group consisting of monoamines and derivatives thereof, monohydrazides and derivatives thereof, monoboronic acids and derivatives thereof, and mononitriles and derivatives thereof. Examples of control agent BP include, but are not limited to, aniline, 2-chloroaniline, 3-chloroaniline, 4-chloroaniline, 1,3-benzothiazole-5-amine, 2-nitroaniline, 3-nitroaniline, 4-nitroaniline, 2-methylaniline, 3-methylaniline, 4-methylaniline, 4-tert-butylaniline, 4-fluoroaniline, 1-naphthylamine, 2-naphthylamine, methylamine, ethylamine, propylamine, butylamine, pentylamine, hexylamine, heptylamine, octylamine, cyclohexylamine, phenylboronic acid, 4-tert-butylphenylboronic acid, n-propylboronic acid, cyclohexylboronic acid, 2,3-dihydroxy naphthalene, ethylene glycol, 2,3-dimethyl-2,3-butanediol, 1,2-cyclohexanediol, benzonitrile, naphthalenenitrile, acetonitrile, cyclohexanenitrile, benzoylhydrazide, 4-chlorobenzoyl hydrazide, nicotinohydrazide, formic acid hydrazide, acetic acid hydrazide, propionic acid hydrazide, cyclohexanoic hydrazide, and combinations thereof. The preferred control agent BP includes aniline, 4-tert-butylaniline, butylamine, phenylboronic acid, benzonitrile, benzoylhydrazide, and combinations thereof. These control agents BP are commercially available or prepared by a known method.

Catalyst CA and catalyst CB are those known in the art for preparing COF materials, which may be the same or different, and selected from the group consisting of carboxylic acids and salts thereof, sulfonic acids and salts thereof, and derivatives thereof. Examples include, but are not limited to, formic acid, acetic acid, trifluoroacetic acid, benzenesulfonic acid, toluenesulfonic acid, scandium triflate, europium triflate, indium triflate, ytterbium triflate, yttrium triflate, zinc triflate, and combinations thereof. For example, see those catalysts disclosed in Dichtel , W. R. et al., "Rapid, Low Temperature Formation of Imine-Linked Covalent Organic Frameworks Catalyzed by Metal Triflates", Journal of the American Chemical Society, 2017, 139, 4999-5002 and Wang W. et al., "Covalent organic frameworks (COFs): from design to applications", Chemical Society Reviews, 2013, 42, 548-568, all of which are incorporated herein by reference. Some catalysts, such as formic acid, can act as a solvent in the method of the present invention. In this case, higher concentration of the catalyst is feasible.

The concentration of catalyst CA in solution A and the concentration of catalyst CB in solution B are usually 0-20M, preferably 0-18M, respectively.

In the method, the concentration of monomer A in solution A and the concentration of monomer B in solution B are 0.01-100 mM, preferably 0.1-50 mM, more preferably 0.2-25 mM, respectively. The molar ratio of the control agent AP to the monomer A and the molar ratio of the control agent BP to the monomer B are 0.01-200:1, preferably 0.1-100:1, more preferably 0.5-50:1. The molar ratio of monomer A to monomer B is 0.05-20:1, preferably 0.1-10:1, more preferably 0.25-4:1.

The temperature and time of the reaction are known in the art. For example, the reaction is carried out at a temperature of 0-200° C., preferably 0-150° C.; and the reaction time is usually 0.01-100 hours, preferably 0.05-80 hours, more preferably 0.1-70 hours.

In another aspect, the present invention also relates to a COF material obtainable by the above preparation method, which has high crystallinity, high specific surface area and improved morphological characteristics. For example, the COF material usually has a grain size of 50-170 nm, preferably 60-150 nm, a specific surface area of 1000-2500 $m^2/g$, preferably 1100-2200 $m^2/g$; and/or a particle size of 100-100,000 nm, preferably 150-30,000 nm, and a particle size distribution of 1-8, preferably 1-3.

In addition, the COF material obtained by the preparation method of the present invention is usually in the form of spherical, granular, rod-shaped, hollow fiber or flake-shaped, which can be controlled according to actual needs, for example, a spherical COF with a small particle size required for supporting a catalyst, a rod-shaped COF required for drug release, etc.

In another aspect, the present invention provides a method for repairing defects of existing COF materials—Reversible Degradation-Recombination (RDR). Specifically, the present invention provides a method for repairing defects of a COF material by RDR, comprising the steps:

dispersing COF-A material in a solvent containing control agents AP and BP and optionally a catalyst to obtain a dispersion;

allowing the dispersion to react; and separating obtained precipitate and drying it to obtain a COF material.

In the above method, the COF-A material is any kind of COF materials prepared by any existing method, and it usually has a grain size of 1-50 nm and a specific surface area of 100-1500 $m^2/g$. Many methods for preparing COF materials have been reported, including, for example, the methods described in the background art above, and "Segura, J. L. et al., "Covalent organic frameworks based on Schiff-base chemistry: synthesis, properties and potential applications" by Segura, J L et al., Chemical Society Reviews, 2016, 45: 5635-5671, and Jiang, J. et al.,"Covalent Chemistry beyond Molecules", Journal of the American Chemical Society, 2016, 138, 3255-3265.

In the above method, the control agents AP and BP, the catalyst and the solvent are as described above.

The concentration of COF-A in the dispersion is 0.01-100:1 mg/ml, preferably 0.1-50:1, more preferably 0.2-30:1. The concentration of the control agents AP and BP in the dispersion is 0.01-1000 mM, preferably 0.05-800 mM, more preferably 0.1-500 mM.

The concentration of the catalyst in the dispersion is 0-20M, preferably 0-18M.

The reaction is usually carried out at a temperature of 0-200° C., preferably 0-150° C. The reaction time is usually 0.01-200 hours, preferably 0.1-150 hours, more preferably 0.2-100 hours.

The repairing method of the present invention can repair the performance defects of the COF materials prepared by the known method or the existing COF materials, such as low crystallinity and low specific surface area, increase the crystal grain size and specific surface area, and improve the morphological characteristics. For example, the COF materials obtained by the repairing method of the present invention usually have a grain size of 50-150 nm, preferably 60-120 nm; and a specific surface area of 800-2500 $m^2/g$, preferably 900-2000 $m^2/g$.

EMBODIMENTS

The embodiments of the present invention are illustrated with following examples, however, these examples are only exemplary and should not be interpreted as limiting of the present invention.

In the examples, the specific surface area is obtained by determining nitrogen adsorption with a specific surface area analyzer. The grain size is measured by X-ray diffraction method. The particle size and particle size distribution are measured by scanning electron microscopy.

Example 1

Preparation of COF1

10 μmol of 1,4-phenylenediamine was dissolved in 50 mL of acetic acid, and added 0.5 mmol of benzaldehyde to prepare solution A. 7 μmol of trimesaldehyde was dissolved in 50 mL of acetic acid, and added 0.5 mmol of aniline to prepare solution B. The solution A and solution B were mixed, and reacted at 25° C. for 5 minutes. The resulting COF1 was filtered, washed with acetone 3 times, and dried in a vacuum oven at 50° C. for 1 day to obtain a product of spherical particles with a specific surface area of 1520 $m^2/g$, a grain size of 83 nm, a particle size of 1200 nm and a particle size distribution of 1.9.

Example 2

Preparation of COF2

50 μmol of 1,3,5-tris(4-aminophenyl)benzene was dissolved in 10 mL of dioxane, added 0.75 mmol of 4-tert-butylbenzaldehyde and 200 μmol of benzenesulfonic acid to make solution A. 75 μmol of biphenyl dialdehyde was dissolved in 10 mL of dioxane, added 0.75 mmol of 4-nitroaniline and 200 μmol of benzenesulfonic acid to prepare solution B. The solution A and the solution B were mixed and reacted at 90° C. for 20 hours. The resulting COF2 was filtered, washed with dioxane 3 times, and dried in a vacuum oven at 70° C. for 1 day to obtain a product of hollow fibers with a specific surface area of 1310 $m^2/g$, a grain size of 63 nm, a diameter of 890±100 nm, a length of 21300±1400 nm and a wall thickness of 50±8 nm.

Example 3

Preparation of COF3

100 μmol of 2,4,6-tris(4-aminophenyl)-1,3,5-triazine was dissolved in 100 mL of dioxane/mesitylene (4/1, v/v), and added 0.5 mmol of butyraldehyde and 100 μmol of scandium triflate to prepare solution A. 150 μmol of terephthalaldehyde was dissolved in 100 mL of dioxane/mesitylene (4/1, v/v), and added 0.5 mmol of butylamine and 100 μmol of scandium triflate to prepare solution B. The solution A and the solution B were mixed and reacted at 35° C. for 40 hours. The resulting COF3 was filtered, washed with tetrahydrofuran 3 times, and dried in a vacuum oven at 60° C. for 1 day to obtain a product of flake structure with a specific surface area of 1713 $m^2/g$, a grain size of 113 nm, a thickness of 40±9 nm, and a lamella diameter of 21000±2000 nm.

Example 4

Preparation of COF4

100 μmol of 5,10,15,20-tetra(4-aminophenyl) porphyrin was dissolved in 5 mL of dioxane/mesitylene (2/1, v/v), and added 0.05 mmol of 3-methylbenzaldehyde to prepare solution A. 133 μmol of 2,4,6-trihydroxy trimesicaldehyde was dissolved in 5 mL of dioxane/mesitylene (2/1, v/v), and added 0.05 mmol of 2-naphthylamine to prepare solution B. The solution A and the solution B were mixed and reacted at 150° C. for 100 hours. The resulting COF4 was filtered, washed with ethanol 3 times, and dried in a vacuum oven at 65° C. for 1 day to obtain a product of rod-shaped structure with a specific surface area of 1669 $m^2/g$, a grain size of 105 nm, a length of 880±80 nm, and a diameter of 340±30 nm.

Example 5

Preparation of COF5

500 μmol of 1,4-benzenediboronic acid was dissolved in 100 mL of ethanol, and added 5 mmol of phenylboronic acid and 300 mmol of acetic acid to prepare solution A. 500 μmol of 1,4-benzenediboronic acid was dissolved in 100 mL of ethanol, and added 5 mmol of phenylboronic acid and 300 mmol of acetic acid to prepare solution B. The solution A and the solution B were mixed and reacted at 120° C. for 20 hours. The resulting COFS was filtered, washed with ethanol 3 times, and dried in a vacuum oven at 70° C. for 1 day to obtain a product of spherical particles with a specific surface area of 1123 m$^2$/g, a grain size of 90 nm, a diameter of 177 nm, and a particle size distribution of 2.7.

Example 6

Preparation of COF6

500 μmol of 1,3,5-benzenetriboronic acid was dissolved in 50 mL of ethanol, and added 8 mmol of catechol and 300 mmol of acetic acid to prepare solution A. 500 μmol of 1,2,4,5-benzenetetrol was dissolved in 50 mL of ethanol, and added 8 mmol of 4-tert-butylphenylboronic acid and 300 mmol of acetic acid to prepare solution B. The solution A and the solution B were mixed and reacted at 100° C. for 40 hours. The resulting COF6 was filtered, washed with ethanol 3 times, and dried in a vacuum oven at 70° C. for 1 day to obtain a product of flake-shaped structure with a specific surface area of 2156 m$^2$/g, a grain size of 146 nm, a thickness of 100±30 nm, and a lamella diameter of 28000±8000 nm.

Example 7

Preparation of COF7

400 μmol of 5,10,15,20-tetra(4-boronophenyl)porphyrin was dissolved in 50 mL of N,N-dimethylformamide, and added 7 mmol of 2,3-dihydroxynaphthalene to prepare solution A. 500 μmol of 3,6,7,10,11-hexahydroxytriphenylene was dissolved in 50 mL of N,N-dimethylformamide, and added 7 mmol of phenylboronic acid to prepare solution B. The solution A and the solution B were mixed and reacted at 130° C. for 60 hours. The resulting COF7 was filtered, washed with ethanol 3 times, and dried in a vacuum oven at 60° C. for 1 day to obtain a product of spherical particles with a specific surface area of 1478 m$^2$/g, a grain size of 138 nm, a diameter of 25000 nm, and a particle size distribution of 1.4.

Example 8

Preparation of COF8

200 μmol of terephthalonitrile was dissolved in 100 mL of dimethyl sulfoxide, and added 1 mmol of benzonitrile to prepare solution A. 200 μmol of terephthalonitrile was dissolved in 100 mL of dimethyl sulfoxide, and added 1 mmol of benzonitrile to prepare solution B. The solution A and the solution B were mixed and reacted at 150° C. for 60 hours. The resulting COF8 was filtered, washed with ethanol 3 times, and dried in a vacuum oven at 60° C. for 1 day to obtain a product of spherical particles with a specific surface area of 1058 m$^2$/g, a grain size of 108 nm, a diameter of 8000 nm, and a particle size distribution of 1.2.

Example 9

Preparation of COF9

1000 μmol of terephthalhydrazide was dissolved in 100 mL of chloroform, and added 6 mmol of 4-fluorobenzaldehyde and 200 mM formic acid to prepare solution A. 667 μmol of trimesaldehyde was dissolved in 100 mL of chloroform, and added 6 mmol of benzoyl hydrazide and 200 mM formic acid to prepare solution B. The solution A and the solution B were mixed and reacted at 60° C. for 60 hours. The resulting COF9 was filtered, washed with ethanol 3 times, and dried in a vacuum oven at 60° C. for 1 day to obtain a product of fiber structure with a specific surface area of 1054 m$^2$/g, a grain size of 95 nm, a diameter of 300+40 nm, and a length of 13000+400 nm.

Example 10

Preparation of COF10

600 μmol of 1,3,5-benzenetriboronic acid was dissolved in 100 mL of tetrahydrofuran, and added 8 mmol of ethylene glycol and 50 mM trifluoroacetic acid to prepare solution A. 900 μmol of homogenized 2,3,6,7-naphthalenetetraphenol was dissolved in 100 mL of tetrahydrofuran, and added 8 mmol of 4-tert-butylphenylboronic acid and 50 mM trifluoroacetic acid to prepare solution B. The solution A and the solution B were mixed and reacted at 90° C. for 40 hours. The resulting COF10 was filtered, washed with acetone 3 times, and dried in a vacuum oven at 70° C. for 1 day to obtain a product of spherical particles with a specific surface area of 1453 m$^2$/g, a grain size of 83 nm, and a diameter of 1500±40 nm.

Example 11

Preparation of COF11

3000 μmol of hydrazine was dissolved in 100 mL of acetonitrile, and added 10 mmol of formaldehyde and 1 mM zinc triflate to prepare solution A. 2000 μmol of 2,4,6-trihydroxy trimesicaldehyde was dissolved in 100 mL of acetonitrile, and added 10 mmol of cyclohexylamine and 1 mM zinc triflate to prepare solution B. The solution A and the solution B were mixed and reacted at 30° C. for 90 hours. The resulting COF11 was filtered, washed with acetone 3 times, and dried in a vacuum oven at 40° C. for 1 day to obtain a product of spherical particles with a specific surface area of 1753 m$^2$/g, a grain size of 93 nm and a diameter of 2500±100 nm.

The results of the foregoing Examples 1-11 showed that, by the preparation method of the present invention, COF materials with a grain size greater than 70 nm and a specific surface area greater than 1000 m$^2$/g can be obtained, and the desired structure form of the COF materials can be obtained as required, for example spherical, granular, fibrous, flake-shaped, etc.

Example 12

Repairing the Defects of the Existing COF-A1

COF-A1, prepared from 1,3,5-tris(4-aminophenyl)benzene and terephthalaldehyde under reported conditions (catalyzed by acetic acid at room temperature), has a specific surface area of 651 m$^2$/g and a grain size of 8 nm. 10 mg of the COF-A1 was dispersed in 100 mL of dioxane containing 0.01 mmol benzaldehyde, 0.01 mmol aniline and 300 mmol acetic acid, reacted at 10° C. for 200 hours. The resulting COF-1 was filtered, washed with acetone 3 times, and dried in a vacuum oven at 50° C. for 1 day to obtain a product with a specific surface area of 1387 m$^2$/g and a grain size of 81 nm.

Example 13

Repairing the Defects of Existing COF-A2

COF-A2, prepared from p-phenylenediamine and 3-methylbenzaldehyde under reported conditions (catalyzed by acetic acid at room temperature), has a specific surface area of 518 m$^2$/g and a grain size of 12 nm. 500 mg of the COF-A2 was dispersed in 100 mL of dioxane/mesitylene (4/1, v/v) containing 1 mmol benzaldehyde, 1 mmol 2-naphthylamine and 1 mmol scandium triflate, reacted at 25° C. for 50 hours. The resulting COF-2 was filtered, washed with acetone 3 times, and dried in a vacuum oven at 50° C. for 1 day to obtain a product with a specific surface area of 957 m$^2$/g and a crystal grain size of 65 nm.

Example 14

Repairing the Defects of the Existing COF-A3

COF-A3, prepared from 1,3,5-benzenetriboronic acid and 1,2,4,5-benzenetetrol under the reported conditions (catalyzed by acetic acid at 120° C.), has a specific surface area of 721 m$^2$/g and a grain size of 19 nm. 1000 mg of the COF-A3 was dispersed in 100 mL of dimethyl sulfoxide containing 10 mmol of phenylboronic acid, 10 mmol of 2,3-dihydroxynaphthalene and 10 mmol of acetic acid, and reacted at 100° C. for 40 hours. The resulting COF-3 was filtered, washed with ethanol 3 times, and dried in a vacuum oven at 50° C. for 1 day to obtain a product with a specific surface area of 1867 m$^2$/g and a grain size of 115 nm.

Example 15

Repairing the Defects of the Existing COF-A4

COF-A4, prepared from 1,3,5-benzenetriboronic acid and 3,6,7,10,11-hexahydroxytriphenylene under reported conditions (catalyzed by benzene sulfonic acid at room temperature), has a specific surface area of 619 m$^2$/g, and a grain size of 16 nm. 3000 mg of the COF-A4 was dispersed in 100 mL of N,N-dimethylformamide containing 50 mmol 4-tert-butylbenzeneboronic acid and 50 mmol catechol, and reacted at 150° C. for 70 hours. The resulting COF-4 was filtered, washed with acetone 3 times, and dried in a vacuum oven at 45° C. for 1 day to obtain a product with a specific surface area of 1585 m$^2$/g and a grain size of 98 nm.

Example 16

Repairing the Defects of the Existing COF-A5

COF-A5, prepared from terephthalonitrile under the reported conditions (catalyzed by acetic acid at 120° C.), has a specific surface area of 347 m$^2$/g and a grain size of 6 nm. 1000 mg of the COF-A5 was dispersed in 100 mL tetrahydrofuran containing 50 mmol benzonitrile and 300 mmol acetic acid, and reacted at 120° C. for 60 hours. The resulting COF-5 was filtered, washed with acetone 3 times, and dried in a vacuum oven at 35° C. for 1 day to obtain a product with a specific surface area of 1384 m$^2$/g and a grain size of 78 nm.

Example 17

Repairing the defects of existing COF-A6

COF-A6, prepared from terephthalhydrazide and trimesaldehyde under the reported conditions (catalyzed by acetic acid at room temperature), has a specific surface area of 413 m$^2$/g and a grain size of 10 nm. 300 mg of the COF-A6 was dispersed in 100 mL of dioxane/mesitylene (1/1, v/v) containing 10 mmol 3-fluorobenzaldehyde, benzoyl and 1000 mmol acetic acid, and reacted at 25° C. for 65 hours. The resulting COF-6 was filtered, washed with acetone 3 times, and dried in a vacuum oven at 30° C. for 1 day to obtain a product with a specific surface area of 1257 m$^2$/g and a grain size of 75 nm.

Example 18

Repairing the Defects of the Existing COF-A7

COF-A7, prepared from 3,3'-dinitrobenzidine and 2,4,6-tris(4-aldehyde phenyl)-1,3,5-triazine under reported conditions (catalyzed by acetic acid at 120° C.), has a specific surface area of 536 m$^2$/g and a grain size of 8 nm. 1200 mg of the COF-A7 was dispersed in 100 mL of dioxane/mesitylene (2/1, v/v) containing 6 mmol acetaldehyde, 2-naphthylamine and 15 mmol scandium triflate, and reacted at 55° C. for 45 hours. The resulting COF-7 was filtered, washed with ethanol 3 times, and dried in a vacuum oven at 40° C. for 1 day to obtain a product with a specific surface area of 1143 m$^2$/g and a grain size of 73 nm.

Example 19

Repairing the Defects of the Existing COF-A8

COF-A8, prepared from 2,4,6-tris(4-aminophenyl)-1,3,5-triazine and biphenyl dicarbaldehyde under reported conditions (catalyzed by acetic acid at 120° C.), has a specific surface area of 736 m$^2$/g and a grain size of 9 nm. 2500 mg of the COF-A8 was dispersed in 100 mL ethanol containing 30 mmol 4-tert-butylbenzaldehyde, hexylamine and 1500 mmol formic acid, and reacted at 75° C. for 40 hours. The resulting COF-8 was filtered, washed with ethanol 3 times, and dried in a vacuum oven at 45° C. for 1 day to obtain a product with a specific surface area of 1643 m$^2$/g and a grain size of 78 nm.

The results of the foregoing Examples 12-19 showed that the repair method of the present invention significantly improved the grain size and specific surface area of the COF material prepared by known methods.

The invention claimed is:
1. A method for preparing a covalent organic framework (COF) material by reversible polycondensation-termination (RPT) method, comprising the steps:
   dissolving a monomer A in solvent 1, adding a control agent AP, and optionally adding a catalyst CA to obtain a solution A;
   dissolving a monomer B in solvent 2, adding a control agent BP, and optionally adding a catalyst CB to obtain a solution B;
   mixing the solution A and the solution B to obtain a mixed solution, and allowing the mixed solution to react; and
   after the completion of the reaction, separating obtained precipitate and drying it to obtain a COF material;
   wherein the control agent AP is selected from the group consisting of monoaldehydes and derivatives thereof, monoboric acids and derivatives thereof, catechol, and 2,3-dihydroxyl naphthalene;
   the control agent BP is selected from the group consisting of monoamines and derivatives thereof, monohydrazides and derivatives thereof, and monoboronic acids and derivatives thereof.

2. The method according to claim 1, wherein the monomer A is selected from the group consisting of aromatic amines and derivatives thereof, aromatic hydrazides and derivatives thereof, and aromatic boronic acids and derivatives thereof; the monomer B is selected from the group consisting of aromatic aldehydes and derivatives thereof, aromatic boronic acids and derivatives thereof, and phenols and derivatives thereof.

3. The method according to claim 1, wherein the control agent AP is selected from the group consisting of benzaldehyde, 2-chlorobenzaldehyde, 3-chlorobenzaldehyde, 4-chlorobenzaldehyde, 2-nitrobenzaldehyde, 3-nitrobenzaldehyde, 4-nitrobenzaldehyde, 2-methylbenzaldehyde, 3-methylbenzaldehyde, 4-methylbenzaldehyde, 4-tert-butylbenzaldehyde, 4-fluorobenzaldehyde, 1-naphthaldehyde, 2-naphthaldehyde, formaldehyde, acetaldehyde, propionaldehyde, butyraldehyde, valeraldehyde, hexanal, heptaldehyde, caprylic aldehyde, phenylboronic acid, 4-tert-butylbenzeneboronic acid, n-propylboronic acid, cyclohexylboronic acid, catechol, 2,3-dihydroxyl naphthalene, and combinations thereof; the control agent BP is selected from the group consisting of aniline, 2-chloroaniline, 3-chloroaniline, 4-chloroaniline, 1,3-benzothiazole-5-amine, 2-nitroaniline, 3-nitroaniline, 4-nitroaniline, 2-methylaniline, 3-methylaniline, 4-methylaniline, 4-tert-butylaniline, 4-fluoroaniline, 1-naphthylamine, 2-naphthylamine, methylamine, ethylamine, propylamine, butylamine, pentylamine, hexylamine, heptylamine, octylamine, cyclohexylamine, phenylboronic acid, 4-tert-butylphenylboronic acid, n-propylboronic acid, cyclohexylboronic acid, benzoylhydrazide, 4-chlorobenzoyl hydrazide, nicotinohydrazide, formic acid hydrazide, acetic acid hydrazide, propionic acid hydrazide, cyclohexanoic hydrazide, and combinations thereof.

4. The method according to claim 3, wherein the control agent AP is selected from the group consisting of benzaldehyde, 4-tert-butylbenzaldehyde, butyraldehyde, phenylboronic acid, catechol, and combinations thereof, the control agent BP is selected from the group consisting of aniline, 4-tert-butylaniline, butylamine, phenylboronic acid, benzoylhydrazide, and combinations thereof.

5. The method according to claim 1, wherein the concentration of monomer A in the solution A and the concentration of monomer B in the solution B are 0.01-100 mM, respectively.

6. The method according to claim 1, wherein the molar ratio of the control agent AP to the monomer A and the molar ratio of the control agent BP to the monomer B are 0.01-200:1, respectively; the molar ratio of monomer A to monomer B is 0.05-20:1.

7. The method according to claim 6, wherein the molar ratio of the control agent AP to the monomer A and the molar ratio of the control agent BP to the monomer B are 0.1-100:1, respectively.

8. The method according to claim 7, wherein the molar ratio of the control agent AP to the monomer A and the molar ratio of the control agent BP to the monomer B are 0.5-50:1, respectively.

\* \* \* \* \*